US010262800B2

(12) United States Patent
Mizuno et al.

(10) Patent No.: US 10,262,800 B2
(45) Date of Patent: Apr. 16, 2019

(54) MULTILAYER CERAMIC CAPACITOR

(71) Applicant: TAIYO YUDEN CO., LTD., Taito-ku, Tokyo (JP)

(72) Inventors: Kotaro Mizuno, Takasaki (JP); Yoichi Kato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/461,255

(22) Filed: Mar. 16, 2017

(65) Prior Publication Data

US 2017/0278635 A1    Sep. 28, 2017

(30) Foreign Application Priority Data

Mar. 25, 2016  (JP) ................. 2016-061495

(51) Int. Cl.
*H01G 4/12*    (2006.01)
*H01G 4/30*    (2006.01)
*H01G 4/005*   (2006.01)
*H01G 4/232*   (2006.01)

(52) U.S. Cl.
CPC .............. *H01G 4/30* (2013.01); *H01G 4/005* (2013.01); *H01G 4/12* (2013.01); *H01G 4/232* (2013.01)

(58) Field of Classification Search
CPC ............ H01G 4/30; H01G 4/005; H01G 4/12; H01G 4/232
USPC ....................................... 361/301.4
See application file for complete search history.

(56) References Cited

U.S. PATENT DOCUMENTS

| 9,847,170 | B2* | 12/2017 | Park | H01G 2/065 |
| 2014/0116766 | A1* | 5/2014 | Jeon | H05K 3/3442 174/260 |
| 2014/0345926 | A1* | 11/2014 | Lee | H01G 4/30 174/260 |
| 2015/0022945 | A1* | 1/2015 | Park | H01G 4/30 361/301.4 |
| 2016/0020031 | A1* | 1/2016 | Shin | H01G 4/38 174/260 |

FOREIGN PATENT DOCUMENTS

JP      2014116571 A    6/2014

* cited by examiner

*Primary Examiner* — Michael P McFadden
(74) *Attorney, Agent, or Firm* — Law Office of Katsuhiro Arai

(57) ABSTRACT

In an embodiment, one length-direction end of each first internal electrode layer 111*a* of the capacitor body 110 is connected, via the conductive part 114*a* of the first relay layer 114 connected over a connection width equivalent to the width of each first internal electrode layer 111*a*, to the first external electrode 120 provided on one height-direction face of the capacitor body 110; also, the other length-direction end of each second internal electrode layer 111*b* is connected, via the conductive part 115*a* of the second relay layer 115 connected over a connection width equivalent to the width of each second internal electrode layer 111*b*, to the second external electrode 130 provided on one height-direction face of the capacitor body 110.

5 Claims, 5 Drawing Sheets

MULTILAYER CERAMIC CAPACITOR

BACKGROUND

Field of the Invention

The present invention relates to a multilayer ceramic capacitor comprising a capacitor body of roughly rectangular solid shape, as well as a first external electrode and a second external electrode that are provided on one height-direction face thereof.

Description of the Related Art

FIGS. 1 to 7 of Patent Literature 1 mentioned below disclose a multilayer ceramic capacitor relating to the foregoing. This multilayer ceramic capacitor comprises: a capacitor body of roughly rectangular solid shape, which contains multiple first internal electrode layers of roughly rectangular shape and multiple second internal electrode layers of roughly rectangular shape that are arranged alternately, in the width direction, with dielectric layers in between; as well as a first external electrode of roughly rectangular shape and a second external electrode of roughly rectangular shape, which are provided on one height-direction face of the capacitor body. Each first internal electrode layer has a first lead part of roughly rectangular shape that continues to one height-direction face of the capacitor body, and an end of each first lead part is connected to the first external electrode. Each second internal electrode layer has a second lead part of roughly rectangular shape that continues to one height-direction face of the capacitor body, and an end of each second lead part is connected to the second external electrode.

The aforementioned multilayer ceramic capacitor is constructed in such a way that each first internal electrode layer and each second internal electrode layer are oriented at roughly right angles with the first external electrode and second external electrode, and consequently the length-direction dimension (width) of each first lead part is smaller than the height-direction dimension (width) of each first internal electrode layer, while the length-direction dimension (width) of each second lead part is smaller than the height-direction dimension (width) of each second internal electrode layer. Accordingly, an attempt to meet the demand for size reduction and capacitance increase based on the aforementioned multilayer ceramic capacitor raises the concern that the connection of each first lead part with the first external electrode, and the connection of each second lead part with the second external electrode may become unstable.

To be specific, meeting the demand for size reduction and capacitance increase based on the aforementioned multilayer ceramic capacitor requires decreasing the height-direction dimension (width) and length-direction dimension of each first internal electrode layer, as well as the height-direction dimension (width) and length-direction dimension of each second internal electrode layer; however, the length-direction dimension (width) of each first lead part, and the length-direction dimension (width) of each second lead part, become extremely small when, in particular, the length-direction dimension decreases, and this tends to make the connection of each first lead part with the first external electrode, and the connection of each second lead part with the second external electrode, unstable.

BACKGROUND ART LITERATURES

[Patent Literature 1] Japanese Patent Laid-open No. 2014-116571

SUMMARY

An object of the present invention is to provide a multilayer ceramic capacitor comprising a capacitor body of roughly rectangular solid shape, as well as a first external electrode and a second external electrode that are provided on one height-direction face thereof; wherein such multilayer ceramic capacitor can achieve reliable connection with respect to the connection of each first internal electrode layer to the first external electrode, and also with respect to the connection of each second internal electrode layer to the second external electrode, even when meeting the demand for size reduction and capacitance increase.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention is a multilayer ceramic capacitor comprising a capacitor body of roughly rectangular solid shape, as well as a first external electrode of roughly rectangular shape and a second external electrode of roughly rectangular shape that are provided on one height-direction face thereof, wherein: the capacitor body comprises (1) a capacitive element of roughly rectangular solid shape, which contains multiple first internal electrode layers of roughly rectangular shape and multiple second internal electrode layers of roughly rectangular shape that are arranged alternately with dielectric layers in between, (2) a first cover layer covering one width-direction face of the capacitive element, (3) a second cover layer covering the other width-direction face of the capacitive element, (4) a first relay layer covering one length-direction face of the capacitive element and also in contact with one length-direction end of the first cover layer and one length-direction end of the second cover layer, (5) a second relay layer covering the other length-direction face of the capacitive element and also in contact with the other length-direction end of the first cover layer and the other length-direction end of the second cover layer, (6) a third cover layer covering the exterior face of the first relay layer, and (7) a fourth cover layer covering the exterior face of the second relay layer; the first relay layer has a conductive part of roughly rectangular shape facing each of one length-direction ends of the multiple first internal electrode layers as well as a low-conductive part surrounding the peripheries of the conductive part except for its one height-direction end; the second relay layer has a conductive part of roughly rectangular shape facing each of the other length-direction ends of the multiple second internal electrode layers as well as a low-conductive part surrounding the peripheries of the conductive part except for its one height-direction end; one length-direction ends of the multiple first internal electrode layers are connected to the conductive part of the first relay layer over connection widths equivalent to the respective widths of the multiple first internal electrode layers; the other length-direction ends of the multiple second internal electrode layers are connected to the conductive part of the second relay layer over connection widths equivalent to the respective widths of the multiple second internal electrode layers; one height-direction end of the conductive part of the first relay layer is connected to the first external electrode over a connection width equivalent to the width of the conductive part of the first relay layer; and one height-direction end of the conductive part of the second relay layer is connected to the second external electrode over a connection width equivalent to the width of the conductive part of the second relay layer.

According to the present invention, a multilayer ceramic capacitor comprising a capacitor body of roughly rectangular solid shape, as well as a first external electrode and a second external electrode that are provided on one height-direction face thereof, can be provided; wherein such multilayer ceramic capacitor can achieve reliable connection with respect to the connection of each first internal electrode layer to the first external electrode, and also with respect to the connection of each second internal electrode layer to the second external electrode, even when meeting the demand for size reduction and capacitance increase.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 5A is a section view of FIG. 2 along line S2-S2, while

DESCRIPTION OF THE SYMBOLS

110—Capacitor body, 111—Capacitive element, 111a—First internal electrode layer, 111b—Second internal electrode layer, 112—First cover layer, 113—Second cover layer, 114—First relay layer, 114a—Conductive part of the first relay layer, 114b—Low-conductive part of the first relay layer, 115—Second relay layer, 115a—Conductive part of the second relay layer, 115b—Low-conductive part of the second relay layer, 116—Third cover layer, 117—Fourth cover layer, 120—First external electrode, 130—Second external electrode.

DETAILED DESCRIPTION OF EMBODIMENTS

Figure 1:
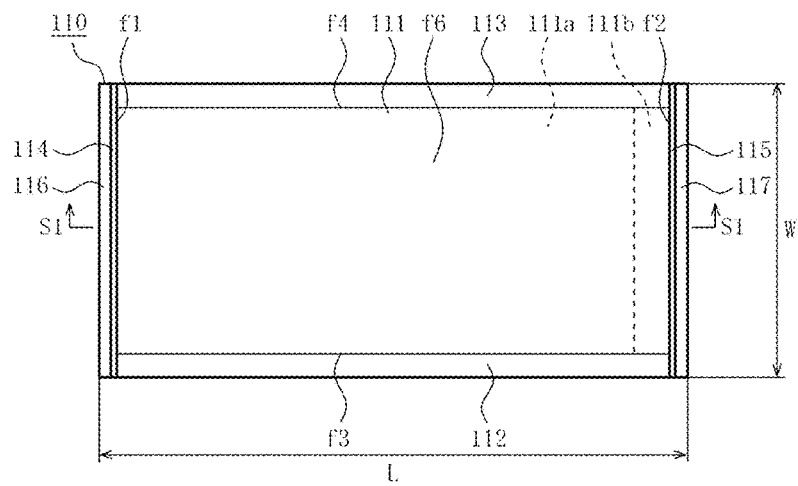
FIG. 1 is a view of a multilayer ceramic capacitor to which the present invention is applied, from the sixth face f6 side of its capacitive element.
Figure 2:
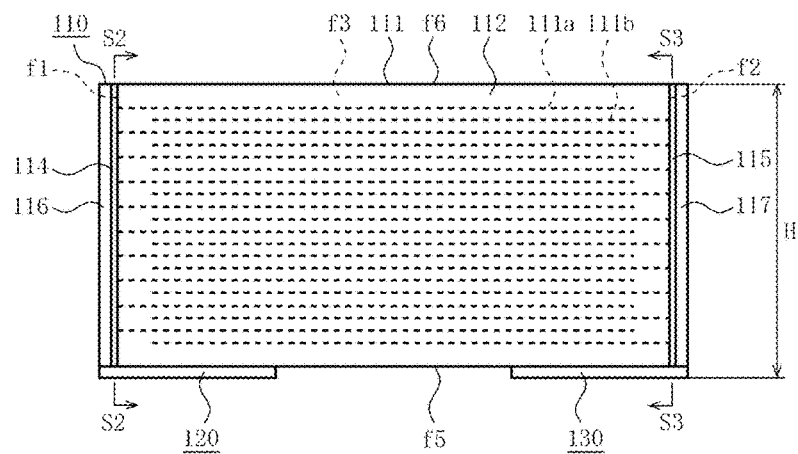
FIG. 2 is a view of the multilayer ceramic capacitor shown in FIG. 1, from the third face f3 side of the capacitive element.
Figure 3:
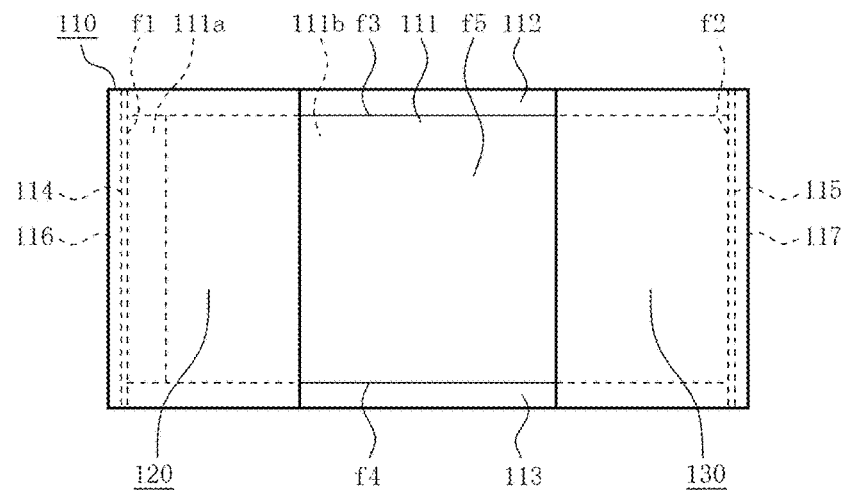
FIG. 3 is a view of the multilayer ceramic capacitor shown in FIG. 1, from the fifth face f5 side of the capacitive element.

First, the construction of a multilayer ceramic capacitor to which the present invention is applied is explained using FIGS. 1 to 6B. In this explanation, the left/right or horizontal direction in FIG. 1 represents the length direction, the up/down or vertical direction in FIG. 1 represents the width direction, and the up/down or vertical direction in FIG. 2 represents the height direction, while the dimensions of each component in the length direction, width, direction and height direction represent the length, width, and height of the component, respectively.

This multilayer ceramic capacitor comprises a capacitor body 110 of roughly rectangular solid shape, as well as a first external electrode 120 of roughly rectangular shape and a second external electrode 130 of roughly rectangular shape that are provided on one height-direction face of the capacitor body 110, and its overall dimensions are specified by length L, width W, and height H. Incidentally, the length L, width W, and height H of the multilayer ceramic capacitor shown in FIGS. 1 to 6B are 1000 μm, 500 μm, and 500 μm, respectively, or 600 μm, 300 μm, and 300 μm, respectively, for example. It should be noted that, while a multilayer ceramic capacitor whose length L, width W, and height H meet the condition of "Length L>Width W=Height H" is depicted in FIGS. 1 to 6B, the relationship of length L, width W, and height H may be "Length L>Width W>Height H" or "Length L>Height H>Width W," or it may also be "Width W>Length L=Height H," "Width W>Length L>Height H," or "Width W>Height H>Length L."

The capacitor body 110 is constituted by a capacitive element 111, a first cover layer 112, a second cover layer 113, a first relay layer 114, a second relay layer 115, a third cover layer 116, and a fourth cover layer 117.

The capacitive element 111 is roughly a rectangular solid in shape, and has a first face f1 and a second face f2 facing each other in the length direction, a third face f3 and a fourth face f4 facing each other in the width direction, and a fifth face f5 and a sixth face f6 facing each other in the height direction. The capacitive element 111 contains multiple first internal electrode layers 111a of roughly rectangular shape and multiple second internal electrode layers 111b of roughly rectangular shape that are arranged alternately, in the height direction, with dielectric layers (not accompanied by symbol) in between. The width, length, and thickness of each first internal electrode layer 111a are roughly the same as the width, length, and thickness of each second internal electrode layer 111b, while each dielectric layer has roughly the same thickness. Incidentally, the thickness of each first internal electrode layer 111a and that of each second internal electrode layer 111b are set in a range of 0.5 to 2 μm, for example, while the thickness of each dielectric layer is set in a range of 0.5 to 2 μm, for example. Also, as shown in FIG. 7A, the width of the capacitive element 111 is roughly the same as the width of the first internal electrode layer 111a and that of the second internal electrode layer 111b, and the capacitive element 111 has margins (not accompanied by symbol) on the fifth face f5 side and sixth face f6 side, respectively. It should be noted that, while 10 first internal electrode layers 111a and 10 second internal electrode layers 111b are depicted in FIGS. 1 to 6B, this is for the purpose of illustration and the number of first internal electrode layers 111a and that of second internal electrode layers 111b may be 11 or more.

For the capacitive element 111, except for each first internal electrode layer 111a and each second internal electrode layer 111b, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, may be used. Also, for each first internal electrode layer 111a and each second internal electrode layer 111b, a good conductor whose primary component is nickel, copper, palladium, platinum, silver, gold, or alloy thereof, etc., may be used.

The first cover layer 112 is roughly rectangular in shape, and is in contact with and covers the third face f3 of the capacitive element 111. The length and height of the first cover layer 112 are roughly the same as the length and height of the third face f3. Because it relates to the width of the capacitor body 110, desirably the thickness of the first cover layer 112 is as thin as possible. Incidentally, the thickness of the first cover layer 112 is set in a range of one to 20 times the thickness of the third cover layer 116 mentioned later or that of the fourth cover layer 117 mentioned later, or preferably in a range of 5 to 20 μm, for example. Also, for the first cover layer 112, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 111 except for the first internal electrode layer 111a and second internal electrode layer 111b, may be used.

The second cover layer 113 is roughly rectangular in shape, and is in contact with and covers the fourth face f4 of the capacitive element 111. The length and height of the second cover layer 113 are roughly the same as the length and height of the fourth face f4. Because it relates to the width of the capacitor body 110, desirably the thickness of the second cover layer 113 is as thin as possible. Incidentally, the thickness of the second cover layer 113 is set in a range of one to 20 times the thickness of the third cover layer 116 mentioned later or that of the fourth cover layer 117 mentioned later, or preferably in a range of 5 to 20 μm, for example. Also, for the second cover layer 113, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 111 except for the first internal electrode layer 111a and second internal electrode layer 111b, may be used.

The first relay layer 114 is roughly rectangular in shape, and is in contact with and covers the first face f1 of the capacitive element 111, while also in contact with one length-direction end of the first cover layer 112 and one length-direction end of the second cover layer 113. The width of the first relay layer 114 is roughly the same as the sum of the width of the first face f1 of the capacitive element 111, thickness of the first cover layer 112, and thickness of the second cover layer 113. The height of the first relay layer 114 is roughly the same as the height of the first face f1 of the capacitive element 111. Because it relates to the length of the capacitor body 110, desirably the thickness of the first relay layer 114 is as thin as possible. Incidentally, the thickness of the first relay layer 114 is set in a range of one to five times the thickness of the first internal electrode layer 111a, or preferably in a range of 0.5 to 5 μm, for example.

Figure 4:
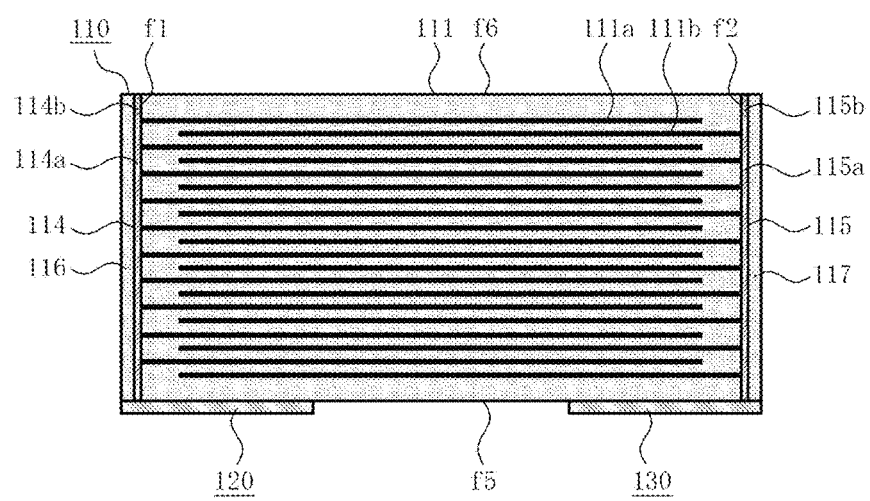
FIG. 4 is a section view of FIG. 1 along line S1-S1.
Figure 5A:
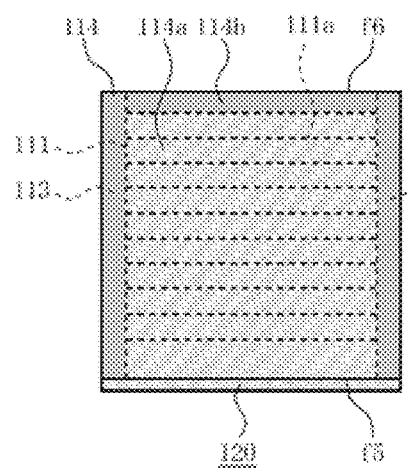

As shown in FIGS. 4 and 5A, the first relay layer 114 has a conductive part 114a of roughly rectangular shape facing one length-direction ends of the first internal electrode layers 111a of the capacitive element 111, as well as a low-conductive part 114b of roughly U shape surrounding the peripheries of the conductive part 114a except for their one height-direction ends. Here, "low-conductive" refers to lower in conductivity compared to the conductive part 114a, or hardly any conductivity. For the conductive part 114a, a good conductor whose primary component is nickel, copper, or alloy thereof, etc., or preferably a good conductor whose primary component is the same as the primary component of the first internal electrode layer 111a and second internal electrode layer 111b, may be used. Also, for the low-conductive part 114b, any material containing a component that lowers conductivity, preferably an oxide of the metal used as the primary component of the conductive part 114a, or specifically nickel oxide, nickel-magnesium composite oxide, etc., may be used. To this conductive part 114a of the first relay layer 114, one length-direction end of each first internal electrode layer 111a is connected over a connection width equivalent to the width of each first internal electrode layer 111a. It should be noted that, while the connection width of one length-direction end of each first internal electrode layer 111a to the conductive part 114a of the first relay layer 114 is ideally the width of each first internal electrode layer 111a, in reality the width of one length-direction end of each first internal electrode layer 111a was confirmed to vary by approx. ±5% of the width of each first internal electrode layer 111a, and therefore the expression "connection width equivalent to the width of each first internal electrode layer 111a" is intentionally used here, instead of "connection width identical to the width of each first internal electrode layer 111a."

The second relay layer 115 is roughly rectangular in shape, and is in contact with and covers the second face f2 of the capacitive element 111, the other length-direction end of the first cover layer 112, and the other length-direction end of the second cover layer 113. The width of the second relay layer 115 is roughly the same as the sum of the width of the second face f2 of the capacitive element 111, thickness of the first cover layer 112, and thickness of the second cover layer 113. The height of the second relay layer 115 is roughly the same as the height of the second face f2 of the capacitive element 111. Because it relates to the length of the capacitor body 110, desirably the thickness of the second relay layer 115 is as thin as possible. Incidentally, the thickness of the second relay layer 115 is set in a range of one to five times the thickness of the second internal electrode layer 111b, or preferably in a range of 0.5 to 5 μm, for example.

Figure 5B:
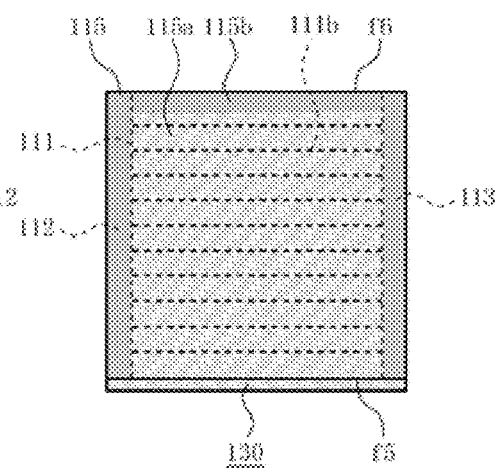
FIG. 5B is a section view of FIG. 2 along line S3-S3.

As shown in FIGS. 4 and 5B, the second relay layer 115 has a conductive part 115a of roughly rectangular shape facing the other length-direction ends of the second internal electrode layers 111b of the capacitive element 111, as well as a low-conductive part 115b of roughly U shape surrounding the peripheries of the conductive part 115a except for its one height-direction end. Here, "low-conductive" refers to lower in conductivity compared to the conductive part 115a, or hardly any conductivity. For the conductive part 115a, a good conductor whose primary component is nickel, copper, or alloy thereof, etc., or preferably a good conductor whose primary component is the same as the primary component of the first internal electrode layer 111a and second internal electrode layer 111b, may be used. Also, for the low-conductive part 115b, any material containing a component that lowers conductivity, preferably an oxide of the metal used as the primary component of the conductive part 115a, or specifically nickel oxide, nickel-magnesium composite oxide, etc., may be used. To this conductive part 115a of the second relay layer 115, the other length-direction end of each second internal electrode layer 111b is connected over a connection width equivalent to the width of each second internal electrode layer 111b. It should be noted that, while the connection width of the other length-direction end of each second internal electrode layer 111b to the conductive part 115a of the second relay layer 115 is ideally the width of each second internal electrode layer 111b, in reality the width of the other length-direction end of each second internal electrode layer 111b was confirmed to vary by approx. ±5% of the width of each second internal electrode layer 111b, and therefore the expression "connection width equivalent to the width of each second internal electrode layer 111b" is intentionally used here, instead of "connection width identical to the width of each second internal electrode layer 111b."

The third cover layer 116 is roughly rectangular in shape, and is in contact with and covers the exterior face of the first relay layer 114. The width and height of the third cover layer 116 are roughly the same as the width and height of the exterior face of the first relay layer 114. Because it relates to the length of the capacitor body 110, desirably the thickness of the third cover layer 116 is as thin as possible. Incidentally, the thickness of the third cover layer 116 is set in a range of one to 10 times the thickness of the dielectric layer present between the first internal electrode layer 111a and second internal electrode layer 111b, or preferably in a range of 1 to 10 μm, for example. Also, for the third cover layer 116, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 111 except for the first internal electrode layer 111a and second internal electrode layer 111b, may be used.

The fourth cover layer 117 is roughly rectangular in shape, and is in contact with and covers the exterior face of the second relay layer 115. The width and height of the fourth cover layer 117 are roughly the same as the width and height of the exterior face of the second relay layer 115. Because it relates to the length of the capacitor body 110, desirably the thickness of the fourth cover layer 117 is as thin as possible. Incidentally, the thickness of the fourth cover layer 117 is set in a range of one to 10 times the thickness of the dielectric layer present between the first internal electrode layer 111a and second internal electrode layer 111b, or preferably in a range of 1 to 10 μm, for example. Also, for the fourth cover layer 117, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 111 except for the first internal electrode layer 111a and second internal electrode layer 111b, may be used.

The first external electrode 120 is roughly rectangular in shape, and provided in contact with the third cover layer 116 side of the fifth face f5 of the capacitive element 111 corresponding to one height-direction face of the capacitor body 110. The width of the first external electrode 120 is roughly the same as the sum of the width of the fifth face f5 of the capacitive element 111, thickness of the first cover layer 112, and thickness of the second cover layer 113. The length of the first external electrode 120 is set in a range of one-eighth to one-third the length L of the multilayer ceramic capacitor, for example, and its thickness is set in a range of 1 to 15 μm, for example. Also, one length-direction end of the first external electrode 120 extends to below the exterior face of the third cover layer 116. To this first external electrode 120, one height-direction end of the conductive part 114a of the first relay layer 114 is connected over a connection width equivalent to the width of the conductive part 114a of the first relay layer 114. It should be noted that, while the connection width of one height-direction end of the conductive part 114a of the first relay layer 114 to the first external electrode 120 is ideally the width of the conductive part 114a of the first relay layer 114, in reality the width of one height-direction end of the conductive part 114a of the first relay layer 114 was confirmed to vary by approx. ±5% of the width of the conductive part 114a of the first relay layer 114, and therefore the expression "connection width equivalent to the width of the conductive part 114a of the first relay layer 114" is intentionally used here, instead of "connection width identical to the width of the conductive part 114a of the first relay layer 114."

The second external electrode 130 is roughly rectangular in shape, and provided in contact with the fourth cover layer 117 side of the fifth face f5 of the capacitive element 111 corresponding to one height-direction face of the capacitor body 110. The width of the second external electrode 130 is roughly the same as the sum of the width of the fifth face f5 of the capacitive element 111, thickness of the first cover layer 112, and thickness of the second cover layer 113. The length of the second external electrode 130 is set in a range of one-eighth to one-third the length L of the multilayer ceramic capacitor, for example, and its thickness is set in a range of 1 to 15 μm, for example. Also, the other length-direction end of the second external electrode 130 extends to below the exterior face of the fourth cover layer 117. To this second external electrode 130, one height-direction end of the conductive part 115a of the second relay layer 115 is connected over a connection width equivalent to the width of the conductive part 115a of the second relay layer 115. It should be noted that, while the connection width of one height-direction end of the conductive part 115a of the second relay layer 115 to the second external electrode 130 is ideally the width of the conductive part 115a of the second relay layer 115, in reality the width of one height-direction end of the conductive part 115a of the second relay layer 115 was confirmed to vary by approx. ±5% of the width of the conductive part 115a of the second relay layer 115, and therefore the expression "connection width equivalent to the width of the conductive part 115a of the second relay layer 115" is intentionally used here, instead of "connection width identical to the width of the conductive part 115a of the second relay layer 115."

Here, the embodiment of the first external electrode 120 and second external electrode 130 is supplemented using FIGS. 5A to 6B.

Figure 6A:
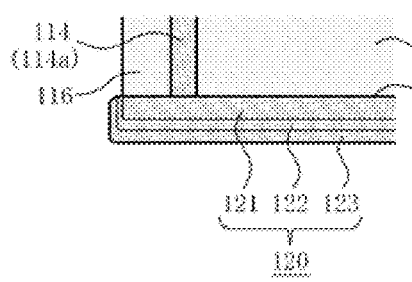
FIGS. 6A and 6B are each a partially enlarged view of FIG. 4.
Figure 6B:
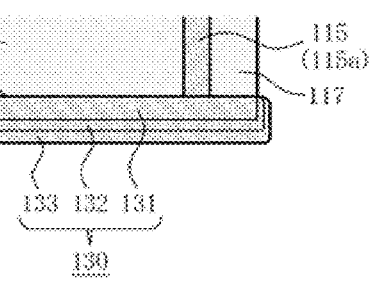
Figure 7A:
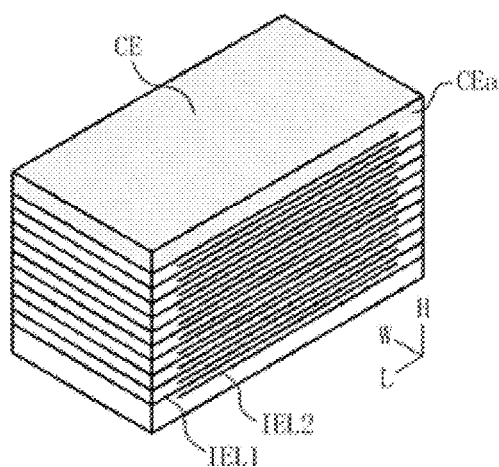
FIGS. 7A, 7B, and 7C are drawings provided to explain an example of manufacturing method of the multilayer ceramic capacitor shown in FIG. 1.

The first external electrode 120 shown in FIG. 6A has a three-layer structure primarily consisting of (1) a base film 121 contacting the fifth face f5 of the capacitive element 111, and also in contact with one height-direction end of the first cover layer 112, one height-direction end of the second cover layer 113, one height-direction end of the first relay layer 114, and one height-direction end of the third cover layer 116, (2) an intermediate film 122 contacting the exterior face of the base film 121, and (3) a surface film 123 contacting the exterior face of the intermediate film 122. Also, the second external electrode 130 shown in FIG. 6B has a three-layer structure primarily consisting of (1) a base film 131 contacting the fifth face f5 of the capacitive element 111, and also in contact with one height-direction end of the first cover layer 112, one height-direction end of the second cover layer 113, one height-direction end of the second relay layer 115, and one height-direction end of the fourth relay layer 117, (2) an intermediate film 132 contacting the exterior face of the base film 131, and (3) a surface film 133 contacting the exterior face of the intermediate film 132.

The base films 121, 131 are constituted by a baked film, for example, and for this baked film, preferably a good conductor whose primary component is nickel, copper, palladium, platinum, silver, gold, or alloy thereof, etc., may be used. The intermediate films 122, 132 are constituted by a plating film, for example, and for this plating film, preferably a good conductor whose primary component is platinum, palladium, gold, copper, nickel, or alloy thereof, etc., may be used. The surface films 123, 133 are constituted by a plating film, for example, and for this plating film, preferably a good conductor whose primary component is copper, tin, palladium, gold, zinc, or alloy thereof, etc., may be used. It should be noted that the first external electrode 120 and second external electrode 130 need not have a three-layer structure; instead, they can have a two-layer structure having no intermediate film 122 or 132, a multi-layer structure having two or more intermediate films 122 or 132, or a single-layer structure having only a surface film 123 or 133.

Figure 7B:
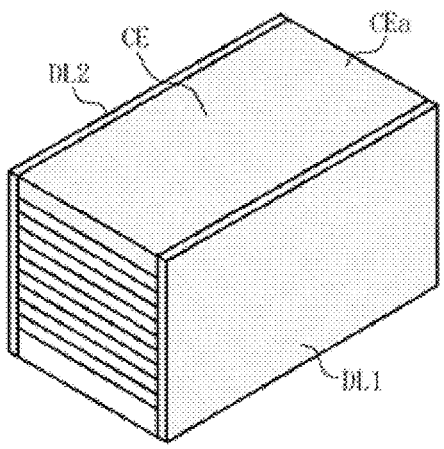
Figure 7C:
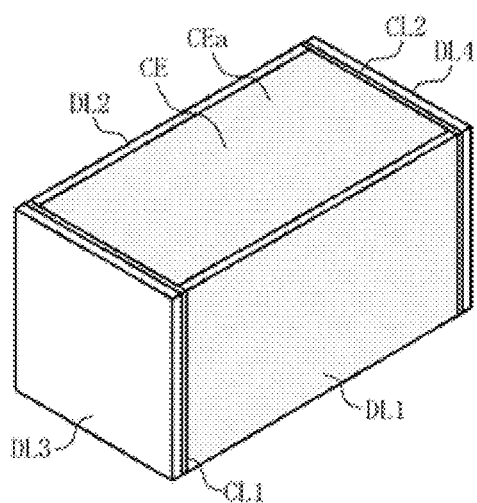

Next, an example of manufacturing method appropriate for the aforementioned multilayer ceramic capacitor is explained by using FIGS. 7A to 7C, and also using the symbols, etc., shown in FIGS. 1 to 6B as deemed appropriate.

For the manufacture, a first ceramic slurry containing dielectric ceramic powder, organic binder, organic solvent and various additives, a second ceramic slurry constituted by the first ceramic slurry and MgO or other oxidization accelerator added to it by 0.1 to 30 atomic percent, an electrode paste containing good conductor powder, organic binder, organic solvent and various additives, and a conductor paste only containing good conductor powder, organic binder, and organic solvent, are prepared.

Next, the first ceramic slurry is coated on the surface of a carrier film and then dried to produce a first sheet. Also, the electrode paste is printed on the surface of such first sheet and then dried to produce a second sheet on which internal electrode layer patterns are formed. Additionally, the conductor paste is printed on the surface of such first sheet and then dried to produce a third sheet on which conductor layer patterns are formed. Furthermore, the second ceramic slurry is coated on the surface of a carrier film and then dried to produce a fourth sheet.

Next, a specified number of unit sheets taken from the first sheet are stacked and thermally compressed one by one, to form an area corresponding to one height-direction margin of the capacitive element 111. Next, a specified number of unit sheets (including internal electrode layer patterns) taken from the second sheet are stacked and thermally compressed one by one, to form an area corresponding to the part of the capacitive element 111 where the first internal electrode layers 111a and second internal electrode layers 111b are present. Next, a specified number of unit sheets taken from the fourth sheet are stacked and thermally compressed one by one, to form an area corresponding to the other height-direction margin of the capacitive element 111. Lastly, the entire laminate is thermally compressed for one last time, to produce an unsintered sheet.

Next, the unsintered sheet is cut into a grid to produce unsintered elements CE, each corresponding to the capacitive element 111 (refer to FIG. 7A). These unsintered elements CE each have multiple unsintered internal electrode layers IEL1, IEL2 that will become the first internal electrode layers 111a and second internal electrode layers 111b, and also have, on the other height-direction face side, an unsintered margin CEa containing the oxidization accelerator.

Next, unsintered elements CE that each look like what is shown in FIG. 7A are aligned in orientation and the fourth sheet is pressed and thermally compressed onto one width-direction face and the other width-direction face of each element, respectively, and after the thermal compression, the fourth sheet is cut to produce unsintered elements CE, each having an unsintered cover layer DL1 formed on one width-direction face, which will become the first cover layer 112, as well as an unsintered cover layer DL2 formed on the other width-direction face, which will become the second cover layer 113 (refer to FIG. 7B). These unsintered cover layers DL1, DL2 contain the oxidization accelerator.

Next, unsintered elements that each look like what is shown in FIG. 7B are aligned in orientation and the conductor layer pattern side of the third sheet is pressed and thermally compressed onto one length-direction face and the other length-direction face of each element, respectively, and after the thermal compression, the third sheet is cut to produce unsintered elements, each looking like what is shown in FIG. 7B and having an unsintered conductor layer CL1 and an unsintered cover layer DL3 formed on one length-direction face, which will become the first relay layer 114 and the third cover layer 116, respectively, as well as an unsintered conductor layer CL2 and an unsintered cover layer DL4 formed on the other length-direction face, which will become the second relay layer 115 and the fourth cover layer 117, respectively (refer to FIG. 7C).

Next, many unsintered elements that each look like what is shown in FIG. 7C are sintered (including binder removal and sintering) all at once in an ambience and at a temperature profile appropriate for the dielectric ceramic powder and good conductor powder contained therein, after which the many sintered elements are barreled, as necessary. This way, capacitor bodies 110 are produced.

In the aforementioned sintering process, if the good conductor powder contained in the unsintered conductor layers CL1, CL2 shown in FIG. 7C is nickel powder, nickel oxides are actively generated in the parts of the unsintered conductor layers CL1, CL2 where they contact the unsintered margins CEa and unsintered cover layers DL1, DL2, and consequently these parts change to low-conductive parts. In other words, the unsintered conductor layers CL1, CL2 shown in FIG. 7C become the first relay layer 114 having the conductive part 114a and low-conductive part 114b (refer to FIG. 5A) as well as the second relay layer 115 having the conductive part 115a and low-conductive part 115b (refer to FIG. 5B) through the aforementioned sintering process.

Next, the capacitor bodies 110 are aligned in orientation and the electrode paste (the same paste as the aforementioned electrode paste or a paste identical to the aforementioned electrode paste except for the type of good conductor powder) is applied or printed on one height-direction face of each, and then dried and baked, to form base films 121, 131. Next, intermediate films 122, 132 covering the base films 121, 131, and surface films 123, 133, are formed by means of plating, to produce a first external electrode 120 and a second external electrode 130.

Next, the main effects (effects e1 and e2) achieved by the aforementioned multilayer ceramic capacitor are explained.

(e1) The capacitor body 110 comprises: (1) a capacitive element 111 of roughly rectangular solid shape, which contains multiple first internal electrode layers 111a of roughly rectangular shape and multiple second internal electrode layers 111b of roughly rectangular shape that are arranged alternately with dielectric layers in between; (2) a first cover layer 112 covering one width-direction face of the capacitive element 111; (3) a second cover layer 113 covering the other width-direction face of the capacitive element 111; (4) a first relay layer 114 covering one length-direction face of the capacitive element 111 and also in contact with one length-direction end of the first cover layer 112 and one length-direction end of the second cover layer 113; (5) a second relay layer 115 covering the other length-direction face of the capacitive element 111 and also in contact with the other length-direction end of the first cover layer 112 and the other length-direction end of the second cover layer 113; (6) a third cover layer 116 covering the exterior face of the first relay layer 114; and (7) a fourth cover layer 117 covering the exterior face of the second relay layer 115.

Also, the first relay layer 114 has a conductive part 114a of roughly rectangular shape facing each of one length-direction ends of the multiple first internal electrode layers 111a as well as a low-conductive part 114b surrounding the peripheries of the conductive part 114a except for its one height-direction end, while the second relay layer 115 has a conductive part 115a of roughly rectangular shape facing each of the other length-direction ends of the multiple second internal electrode layers 111b as well as a low-conductive part 115b surrounding the peripheries of the conductive part 115a except for its one height-direction end. Additionally, one length-direction ends of the multiple first internal electrode layers 111a are connected to the conductive part 114a of the first relay layer 114 over connection widths equivalent to the respective widths of the multiple first internal electrode layers 111a, while the other length-direction ends of the multiple second internal electrode layers 111b are connected to the conductive part 115a of the second relay layer 115 over connection widths equivalent to the respective widths of the multiple second internal electrode layers 111b. Furthermore, one height-direction end of the conductive part 114a of the first relay layer 114 is connected to the first external electrode 120 over a connection width equivalent to the width of the conductive part 114a of the first relay layer 114, while one height-direction end of the conductive part 115a of the second relay layer 115 is connected to the second external electrode 130 over a connection width equivalent to the width of the conductive part 115a of the second relay layer 115.

In other words, the capacitor body 110 is provided with the conductive part 114a of the first relay layer 114, having a function to connect to the first external electrode 120 by utilizing the width of each first internal electrode layer 111a, and also with the conductive part 115a of the second relay layer 115, having a function to connect to the second external electrode 130 by utilizing the width of each second internal electrode layer 111b; accordingly, it is possible to maximally prevent the connection of each first internal electrode layer 111a to the first external electrode 120, and the connection of each second internal electrode layer 111b to the second external electrode 130, from becoming unstable even when the width and length of each first internal electrode layer 111a, and the width and length of each second internal electrode layer 111b, are reduced. This means that the multilayer ceramic capacitor comprising the capacitor body 110 of roughly rectangular solid shape, as well as the first external electrode 120 and second external electrode 130 provided on one height-direction face thereof, can achieve reliable connection with respect to the connection of each first internal electrode layer 111a to the first external electrode 120, and also with respect to the connection of each second internal electrode layer 111b to the second external electrode 130, even when meeting the demand for size reduction and capacitance increase.

Additionally, the capacitor body 110 has the third cover layer 116 covering the exterior face of the first relay layer 114 and the fourth cover layer 117 covering the exterior face of the second relay layer 115, while the first relay layer 114 has the low-conductive part 114b surrounding the peripheries of the conductive part 114a except for its one height-direction end, and the second relay layer 115 has the low-conductive part 115b surrounding the peripheries of the conductive part 115a except for its one height-direction end. This means that, even when the multilayer ceramic capacitor falls over on the circuit board during mounting, the problem of the conductive part 114a of the first relay layer 114 and the conductive part 115a of the second relay layer 115 contacting and therefore shorting with any conductor line on the circuit board or any adjacent electronic component, etc., is prevented in a reliable manner.

(e2) The low-conductive parts 114b, 115b of the first relay layer 114 and second relay layer 115 of the capacitor body 110 contain a component that lowers conductivity, preferably an oxide of the metal used as the primary component of the conductive parts 114a, 115a of the first relay layer 114 and second relay layer 115, and therefore the conductivity of the low-conductive parts 114b, 115b can be made lower than the conductivity of the conductive parts 114a, 115a in an easy and reliable manner because of this metal oxide.

VARIATION EXAMPLES

Next, variation examples (variation example m1 and variation example m2) of the aforementioned multilayer ceramic capacitor are explained.

(m1) While FIGS. 1 to 6B show the first cover layer 112 whose height is roughly the same as the height of the third face f3 of the capacitive element 111, and the second cover layer 113 whose height is roughly the same as the height of the fourth face f4 of the capacitive element 111, overhangs of roughly rectangular shape extending to one width-direction ends of the first external electrode 120 and second external electrode 130 may be provided at both length-direction ends of the first cover layer 112 at one height-direction end, and also overhangs of roughly rectangular shape extending to the other width-direction ends of the first external electrode 120 and second external electrode 130 may be provided at both length-direction ends of the second cover layer 113 at one height-direction end. This way, one width-direction ends of the first external electrode 120 and second external electrode 130 can be covered by the overhangs of the first cover layer 112 at least partially in the thickness direction, and the other width-direction ends of the first external electrode 120 and second external electrode 130 can be covered by the overhangs of the second cover layer 113 at least partially in the thickness direction, although the respective widths of the first external electrode 120 and second external electrode 130 become somewhat narrower.

Figure 8A:
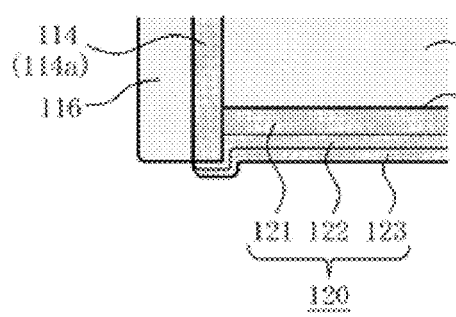
FIGS. 8A and 8B are drawings corresponding to FIGS. 6A and 6B, respectively, illustrating a variation example of the multilayer ceramic capacitor shown in FIG. 1.
Figure 8B:
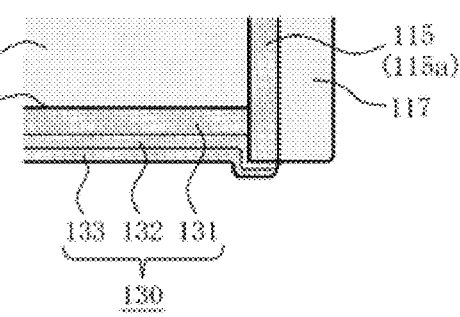

(m2) While FIGS. 1 to 6B show the first external electrode 120 that extends to below the exterior face of the third cover layer 116 at one length-direction end, and the second external electrode 130 that extends to below the exterior face of the fourth cover layer 117 at the other length-direction end, the respective heights of the first relay layer 114 and third cover layer 116 may be increased and the height-increased parts may be projected downward in the figure from the fifth face f5 of the capacitive element 111, while the respective heights of the second relay layer 115 and fourth cover layer 117 may be increased and the height-increased parts may be projected downward in the figure from the fifth face f5 of the capacitive element 111, as shown in FIGS. 8A and 8B. This way, one length-direction end of the first external electrode 120 can be covered by the respective projections of the first relay layer 114 and third cover layer 116 at least partially in the thickness direction, while the other length-direction end of the second external electrode 130 can be covered by the respective projections of the second relay layer 115 and fourth cover layer 117 at least partially in the thickness direction. Also, by combining the aforementioned variation example m1 with this variation example m2, both width-direction ends and one length-direction end of the first external electrode 120 can be covered at least partially in the thickness direction, while both width-direction ends and the other length-direction end of the second external electrode 130 can be covered at least partially in the thickness direction.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-061495, filed Mar. 25, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor, comprising:
   a capacitor body of roughly rectangular solid shape, as well as a first external electrode of roughly rectangular shape and a second external electrode of roughly rectangular shape that are provided on one height-direction face thereof;
   wherein the capacitor body comprises: (1) a capacitive element of roughly rectangular solid shape, which contains multiple first internal electrode layers of roughly rectangular shape and multiple second internal electrode layers of roughly rectangular shape that are stacked alternately with dielectric layers in between in the height direction, wherein one length-direction ends of the multiple first internal electrode layers, not the multiple second internal electrode layers, are exposed on one length-direction face of the capacitive element, whereas one length-direction ends of the multiple second internal electrode layers, not the multiple first internal electrode layers, are exposed on another length-direction face of the capacitive element; (2) a first cover layer covering one width-direction face of the capacitive element, having one length-direction end face flush with the one length-direction face of the capacitive element, and having another length-direction end face flush with the other length-direction face of the capacitive element; (3) a second cover layer covering another width-direction face of the capacitive element, having one length-direction end face flush with the one length-direction face of the capacitive element, and having another length-direction end face flush with the other length-direction face of the capacitive element; (4) one height-direction margin layer covering the one height-direction face of the capacitive element; and (5) another height-direction margin layer covering another height-direction face of the capacitive element, having one length-direction end face flush with the one length-direction face of the capacitive element, and having another length-direction end face flush with the other length-direction face of the capacitive element; (6) a first relay layer covering and contacting (i) the one length-direction face of the capacitive element on which the one length-direction ends of the multiple first internal electrode layers are exposed, (ii) the one length-direction end face of the first cover layer, (iii) the one length-direction end face of the second cover layer, and (iv) the one length-direction end face of the other height-direction margin layer; (7) a second relay layer covering the other length-direction face of the capacitive element and also in contact with the other length-direction end face of the first cover layer and the other length-direction end face of the second cover layer; (8) a third cover layer covering an exterior face of the first relay layer; (9) a fourth cover layer covering an exterior face of the second relay layer;
   wherein the first relay layer has (a) a high-conductive part of roughly rectangular shape facing and contacting each of the one length-direction ends of the multiple first internal electrode layers as well as (b) a low-conductive part surrounding peripheries of the high-conductive part except for one height-direction end of the high-conductive part, and facing and contacting the one length-direction end face of the first cover layer, the one length-direction end face of the second cover layer, and the one length-direction end face of the other height-direction margin layer;

wherein the second relay layer has (a) a high-conductive part of roughly rectangular shape facing and contacting each of the other length-direction ends of the multiple second internal electrode layers as well as (b) a low-conductive part surrounding peripheries of the high-conductive part except for one height-direction end of the high-conductive part, and facing and contacting the other length-direction end face of the first cover layer, the other length-direction end face of the second cover layer, and the other length-direction end face of the other height-direction margin layer;

wherein the one length-direction ends of the multiple first internal electrode layers are electrically connected to the high-conductive part of the first relay layer over connection widths equivalent to respective widths of the multiple first internal electrode layers;

wherein the other length-direction ends of the multiple second internal electrode layers are electrically connected to the high-conductive part of the second relay layer over connection widths equivalent to respective widths of the multiple second internal electrode layers;

wherein the one height-direction end face of the high-conductive part of the first relay layer is electrically connected to the first external electrode over a connection width equivalent to a width of the high-conductive part of the first relay layer; and wherein the one height-direction end face of the high-conductive part of the second relay layer is electrically connected to the second external electrode over a connection widths equivalent to a width of the high-conductive part of the second relay layer.

2. A multilayer ceramic capacitor according to claim 1, wherein the low-conductive parts of the first relay layer and second relay layer respectively contain a component that lowers conductivity.

3. A multilayer ceramic capacitor according to claim 2, wherein the component that lowers conductivity is an oxide of a metal used as a primary component of the high-conductive part of the first relay layer and also of the high-conductive part of the second relay layer.

4. A multilayer ceramic capacitor according to claim 1, wherein the first relay layer is a non-plated, sintered layer whereas the first external electrode includes a plated layer, and the second relay layer is a non-plated, sintered layer whereas the second external electrode includes a plated layer.

5. A multilayer ceramic capacitor according to claim 1, wherein the high-conductive part and the low-conductive part of the first relay layer are made of a same conductive composition except that a metal element contained in the composition is more oxidized in the low-conductive part than in the high-conductive part, and the high-conductive part and the low-conductive part of the second relay layer are made of a same conductive composition except that a metal element contained in the composition is more oxidized in the low-conductive part than in the high-conductive part.

* * * * *